United States Patent
Dublin et al.

(10) Patent No.: US 10,681,484 B2
(45) Date of Patent: *Jun. 9, 2020

(54) PHANTOM CENTER IMAGE CONTROL

(71) Applicant: Bose Corporation, Framingham, MA (US)

(72) Inventors: Michael Scott Dublin, Arlington, MA (US); Charles Terence Henry Oswald, Salem, NY (US); Eduardo T. Salvador, Cambridge, MA (US); Jeffery Robert Vautin, Worcester, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,851

(22) Filed: Apr. 30, 2019

(65) Prior Publication Data
US 2019/0387345 A1    Dec. 19, 2019

Related U.S. Application Data

(63) Continuation of application No. 16/010,705, filed on Jun. 18, 2018, now Pat. No. 10,313,819.

(51) Int. Cl.
*H04S 7/00* (2006.01)
*H04R 5/04* (2006.01)
(Continued)

(52) U.S. Cl.
CPC .............. *H04S 7/302* (2013.01); *G06F 3/165* (2013.01); *H04R 3/04* (2013.01); *H04R 5/02* (2013.01);
(Continued)

(58) Field of Classification Search
CPC ...... H04S 7/302; H04S 3/008; H04S 2400/01; G06F 3/165; H04R 3/04; H04R 5/02; H04R 5/04; H04R 2499/13; H04R 3/008
See application file for complete search history.

(56) References Cited

U.S. PATENT DOCUMENTS 10,313,819 B1 * 6/2019 Dublin .................... H04R 3/04
2005/0074135 A1    4/2005 Kushibe
(Continued)

FOREIGN PATENT DOCUMENTS

JP        2007116363 A  *  5/2007

OTHER PUBLICATIONS

English machine translation of Yamamoto JP 2007-116363 (Yamamoto, Acoustic Space Control Apparatus, published May 2007).*

*Primary Examiner* — Mark Fischer
(74) *Attorney, Agent, or Firm* — Hoffman Warnick LLC

(57) ABSTRACT

In some implementation, a method includes: receiving at least one user interface command to modify a phantom center image of audio output from the audio system in the automobile, wherein the user interface command comprises a user profile command or a preset command attributed to a user of the automobile, wherein the user profile command or the preset command is obtained from an identification file attributed to the user, wherein the phantom center image of the audio output comprises a designated position of sound produced by a set of speakers in the audio system other than physical locations of the set of speakers in the audio system; and adjusting a perceived location of the phantom center image of the audio output from the audio system based upon the at least one user interface command to modify the phantom center image of the audio output.

20 Claims, 8 Drawing Sheets

(51) Int. Cl.
*G06F 3/16* (2006.01)
*H04R 5/02* (2006.01)
*H04S 3/00* (2006.01)
*H04R 3/04* (2006.01)

(52) U.S. Cl.
CPC .............. *H04R 5/04* (2013.01); *H04S 3/008* (2013.01); *H04R 2499/13* (2013.01); *H04S 2400/01* (2013.01)

(56) References Cited

U.S. PATENT DOCUMENTS

2015/0169280 A1\* 6/2015 Suzuki ..................... H04S 7/30
715/716
2017/0150288 A1 5/2017 Dublin et al.

\* cited by examiner

PHANTOM CENTER IMAGE CONTROL

PRIORITY CLAIM

This application is a continuation application of U.S. patent application Ser. No. 16/010,705, filed on Jun. 18, 2018, which is herein incorporated by reference in its entirety.

TECHNICAL FIELD

This disclosure generally relates to automobile sound stage control. More particularly, the disclosure relates to approaches and related systems for controlling the phantom center image of an audio output in an automobile.

BACKGROUND

In some automobile audio systems, processing is applied to the audio signals provided to each speaker based on the electrical and acoustic response of the total system, that is, the responses of the speakers themselves and the response of the vehicle cabin to the sounds produced by the speakers. Such a system is highly individualized to a particular automobile model and trim level, taking into account the location of each speaker and the absorptive and reflective properties of the seats, glass, and other components of the car, among other things. Such a system is generally designed as part of the product development process of the vehicle and corresponding equalization and other audio system parameters are loaded into the audio system at the time of manufacture or assembly.

Conventional automobile audio systems, with stereo speakers in front of and behind the front seat passengers, include controls generally called fade and balance. The same stereo signal is sent to both front and rear sets of speakers, and the fade control controls the relative signal level of front and rear signals, while the balance control controls the relative signal level of left and right signals. While fade and balance control permit users to modify some aspects of the automobile audio output, conventional automobile audio systems do not allow users to make additional modifications to the audio output, such as center image placement, stereo image width and/or presentation of uncorrelated content. These limited controls can hinder the user experience.

SUMMARY

All examples and features mentioned below can be combined in any technically possible way.

Various implementations include automobile audio systems and related control methods. In some implementations, the automobile audio system includes a control system with a user interface for permitting user control of the spatial placement of audio output in the automobile. In certain implementations, the control system permits user control of the perceived location of the phantom center image of the audio output.

In some particular aspects, a computer-implemented method of controlling an audio system with at least two inputs in an automobile includes: receiving at least one user interface command to modify a phantom center image of audio output from the audio system in the automobile, where the phantom center image of the audio output includes a designated position of sound produced by a set of speakers in the audio system other than physical locations of the set of speakers in the audio system; and adjusting a perceived location of the phantom center image of the audio output from the audio system based upon the at least one user interface command to modify the phantom center image of the audio output.

In additional particular aspects, an automobile audio system includes: a set of speakers for generating an audio output in an automobile; and a control system including a user interface, the control system coupled with the set of speakers and configured to: receive at least one user interface command, via the user interface, to modify a phantom center image of the audio output from the set of speakers, wherein the phantom center image of the audio output includes a designated position of sound produced by the set of speakers other than physical locations of the set of speakers; and adjust a perceived location of the phantom center image of the audio output from the set of speakers based upon the at least one user interface command to modify the phantom center image of the audio output.

In further particular aspects, a computer-implemented method of controlling an audio system with at least two inputs in an automobile includes: receiving at least one user interface command to modify a phantom center image of audio output from the audio system in the automobile, wherein the user interface command comprises a user profile command or a preset command attributed to a user of the automobile, wherein the user profile command or the preset command is obtained from an identification file attributed to the user, wherein the phantom center image of the audio output comprises a designated position of sound produced by a set of speakers in the audio system other than physical locations of the set of speakers in the audio system; and adjusting a perceived location of the phantom center image of the audio output from the audio system based upon the at least one user interface command to modify the phantom center image of the audio output.

In additional particular aspects, an automobile audio system includes: a set of speakers for generating an audio output in an automobile; and a control system comprising a user interface, the control system coupled with the set of speakers and configured to: receive at least one user interface command, via the user interface, to modify a phantom center image of the audio output from the set of speakers, wherein the phantom center image of the audio output comprises a designated position of sound produced by the set of speakers other than physical locations of the set of speakers; adjust a perceived location of the phantom center image of the audio output from the set of speakers based upon the at least one user interface command to modify the phantom center image of the audio output; apply a first set of filters that causes sound produced by the set of speakers to have characteristics at an intended position of a user's head of sound produced by a sound source located at a first designated position other than the physical locations of the set of speakers; and in response to the at least one user interface command, apply a second set of filters that causes sound produced by the set of speakers to have characteristics at the intended position of the user's head of sound produced by a sound source located at a second designated position other than the physical locations of the set of speakers and different from the first designated position.

In other particular aspects, a computer-implemented method of controlling an audio system with at least two inputs in an automobile, the method including: receiving at least one user interface command to modify a phantom center image of audio output from the audio system in the automobile, wherein the phantom center image of the audio output comprises a designated position of sound produced by a set of speakers in the audio system other than physical locations of the set of speakers in the audio system; adjusting a perceived location of the phantom center image of the audio output from the audio system based upon the at least one user interface command to modify the phantom center image of the audio output; applying a first set of filters that causes sound produced by the set of speakers to have characteristics at an intended position of a user's head of sound produced by a sound source located at a first designated position other than the physical locations of the set of speakers; and in response to the at least one user interface command, apply a second set of filters that causes sound produced by the set of speakers to have characteristics at the intended position of the user's head of sound produced by a sound source located at a second designated position other than the physical locations of the set of speakers and different from the first designated position.

Implementations may include one of the following features, or any combination thereof.

In certain aspects, the audio system provides the audio output across a soundstage with an approximately static left channel output and approximately static right channel output while adjusting the perceived location of the phantom center image of the audio output, where the designated position of sound produced by the set of speakers in the audio system is detectable by a user and includes an inter-aural phase and inter-aural level as perceived by the user that is consistent with a source from the designated position.

In some implementations, the phantom center image is initially set to a default designated position. In particular cases, the default designated position is defined by a user or according to a characteristic of the automobile.

In certain aspects, the at least one user interface command includes a control value command for shifting the phantom center image of the audio output.

In particular cases, the perceived location of the phantom center image of the audio output is adjusted by modifying a filter weight on at least one speaker in the audio system.

In some implementations, the perceived location of the phantom center image is adjustable across a range of pre-defined angles, the adjusting including matching the at least one user interface command to a nearest one of the pre-defined angles to provide the adjusted perceived location of the phantom center image of the audio output.

In certain cases, the at least one user interface command includes a plurality of commands from distinct user interface controls to modify a plurality of phantom center images of audio output, each relative to distinct seating locations, from the audio system in the automobile.

In particular aspects, the user interface command includes a user profile command or a preset command attributed to a user of the automobile, where the user profile command or the preset command is obtained from an identification file attributed to the user.

In some cases, adjusting the perceived location of the phantom center image of the audio output includes adjusting at least one of a center image azimuth angle of the audio output, a center image distance of the audio output or a center image elevation of the audio output.

In certain implementations, the computer-implemented method further includes: receiving at least one additional user interface command to modify at least one of a left channel output, a right channel output or content produced through an up-mixing of an audio system signal or additional audio channels across the audio system; and adjusting an additional spatial placement of the audio output from the audio system based upon the at least one additional user interface command.

In some aspects, the set of speakers provides the audio output across a soundstage with an approximately static left channel output and approximately static right channel output while adjusting the perceived location of the phantom center image of the audio output, and the designated position of sound produced by the set of speakers in the audio system is detectable by a user and includes an inter-aural phase and inter-aural level as perceived by the user that is consistent with a source from the designated position.

In particular cases, the control system is further configured to: apply a first set of filters that causes sound produced by the set of speakers to have characteristics at an intended position of a user's head of sound produced by a sound source located at a first designated position other than the physical locations of the set of speakers; and in response to the at least one user interface command, apply a second set of filters that causes sound produced by the set of speakers to have characteristics at the intended position of the user's head of sound produced by a sound source located at a second designated position other than the physical locations of the set of speakers and different from the first designated position.

In certain implementations, the control system is further configured to: receive at least one additional user interface command to modify at least one of a left channel output, a right channel output or a phase difference across the set of speakers; and adjust an additional spatial placement of the audio output from the set of speakers based upon the at least one additional user interface command.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
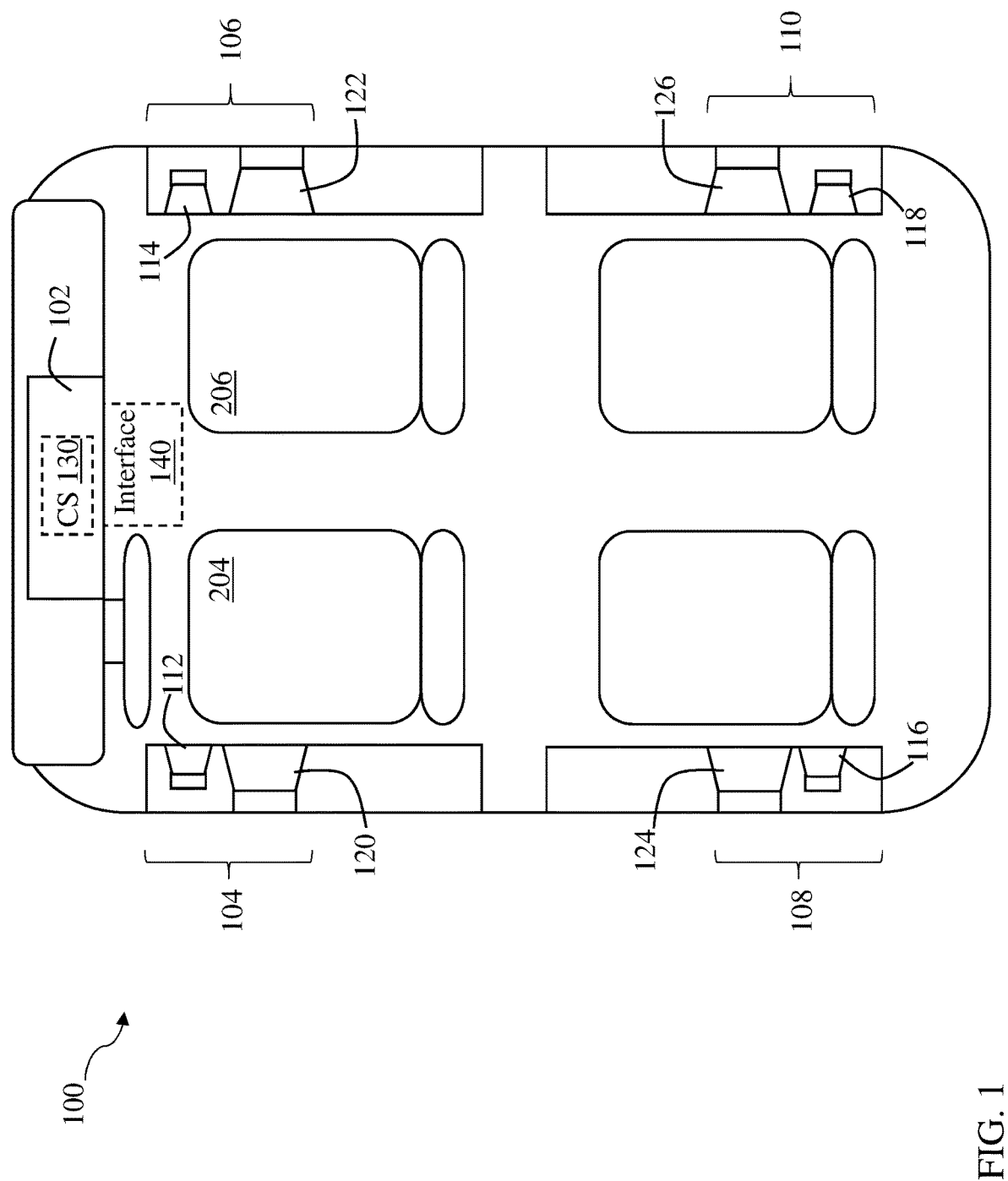
FIG. 1 is a schematic perspective view of an audio system in an automobile according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a control system can be beneficially incorporated into an automobile audio system. For example, an automobile audio system can be programmatically controllable to modify aspects of a soundstage in the automobile, such as the placement of the phantom center image, the width of the stereo image or presentation of uncorrelated content. The system and related method can significantly improve the user experience when compared with conventional automobile audio systems.

Commonly labeled components in the FIGURES are considered to be substantially equivalent components for the purposes of illustration, and redundant discussion of those components is omitted for clarity.

Conventional car audio systems are based around a set of four or more speakers, two on the instrument panel or in the front doors and two generally located on the rear package shelf, in sedans and coupes, or in the rear doors or walls in wagons and hatchbacks. The audio system 100 shown in FIG. 1 depicts a wagon or hatchback configuration including a speaker on each of the four doors. It is understood that this configuration is only one example of an audio system used to illustrate various implementations of the disclosure, and that a variety of additional configurations can be utilized with these implementations.

Audio system 100 is shown including a combined source/processing/amplifying unit 102. In some examples, the different functions may be divided between multiple components. In particular, the source is often separated from the amplifier, and the processing is provided by either the source or the amplifier, though the processing may also be provided by a separate component. The processing may also be provided by software loaded onto a general purpose computer providing functions of the source and/or the amplifier. We refer to signal processing and amplification provided by "the system" generally, without specifying any particular system architecture or technology.

The audio system 100 shown in FIG. 1 has four sets of speakers 104, 106, 108, 110 permanently attached to the vehicle structure. We refer to these as "fixed" speakers. In the example of FIG. 1, each set of fixed speakers includes two speaker elements, commonly a tweeter 112, 114, 116, 118 and a low-to-mid range speaker element 120, 122, 124, 126. In another common arrangement, the smaller speaker is a mid-to-high frequency speaker element and the larger speaker is a woofer, or low-frequency speaker element. The two or more elements may be combined into a single enclosure or may be installed separately. The speaker elements in each set may be driven by a single amplified signal from the source/processing/amplifying unit 102, with a passive crossover network (which may be embedded in one or both speakers) distributing signals in different frequency ranges to the appropriate speaker elements. Alternatively, the source/processing/amplifying unit 102 may provide a band-limited signal directly to each speaker element. In other examples, full range speakers are used, and in still other examples, more than two speakers are used per set. Each individual speaker shown may also be implemented as an array of speakers, which may allow more sophisticated shaping of the sound, or simply a more economical use of space and materials to deliver a given sound pressure level.

As described herein, the source/processing/amplifying unit 102 can include (or be coupled with) a control system 130 configured to aid in controlling the audio output in the audio system 100. In particular implementations, as described herein, control system 130 is configured to adjust a perceived location of the phantom center image of the audio output from audio system 100. The perceived location of the phantom center image is the location from which the synthesized output of the speakers 104, 106, 108, 110 appears to originate. In certain cases, the phantom center image sounds as though it is originating from the same physical distance between the listener and the directionally nearest physical speaker 104, 106, 108, 110. This phantom center image can be differentiated from many uses of "virtual" speakers, which rely upon near field (headrest-type) speakers to produce a sound that appears to originate from a location at which speakers are not physically present. This virtual speaker configuration often adds distance from the listener to the physical speaker (e.g., the near field speaker), which makes the virtual speaker configuration sound less like a naturally occurring playback than a phantom center image in an automobile setting.

While the control system 130 can include hardware and/or software for controlling signal processing and additional functions described herein, it is understood that one or more aspects of the control system 130 (and its corresponding functions) can be implemented using one or more remote computing devices (e.g., cloud computing devices) which are programmatically linked with the source/processing/amplifying unit 102. As noted herein, the control system 130 can include any software-based, electrical and/or electromechanical control configuration capable of receiving control instructions (e.g., via an interface or other communication protocol) and adjusting a perceived location of the phantom center image of the audio output from audio system 100 (including speakers 104, 106, 108, 110) via the source/processing/amplifying unit 102.

Control system 130 may actuate adjustment of the perceived location of the phantom center image in response to a command received locally, e.g., at an interface 140 such as a user interface (UI) or application programming interface (API), or via a network-connected device. An example interface 140 is illustrated in FIG. 1. It is understood that this interface 140 is shown in phantom because the interface may be integrated into the control system 130, part of an existing control interface for the audio system 100, or part of any linked interface (e.g., a software application interface) for providing an interface command to control system 130. In particular implementations, the control system 130 can be configured to receive commands via interface 140, either directly or from a network connected device such as a remote control, smartphone, tablet, wearable electronic device, voice-controlled command system, etc., and may communicate over any network connection (e.g., cloud-based or distributed computing system).

Figure 2:
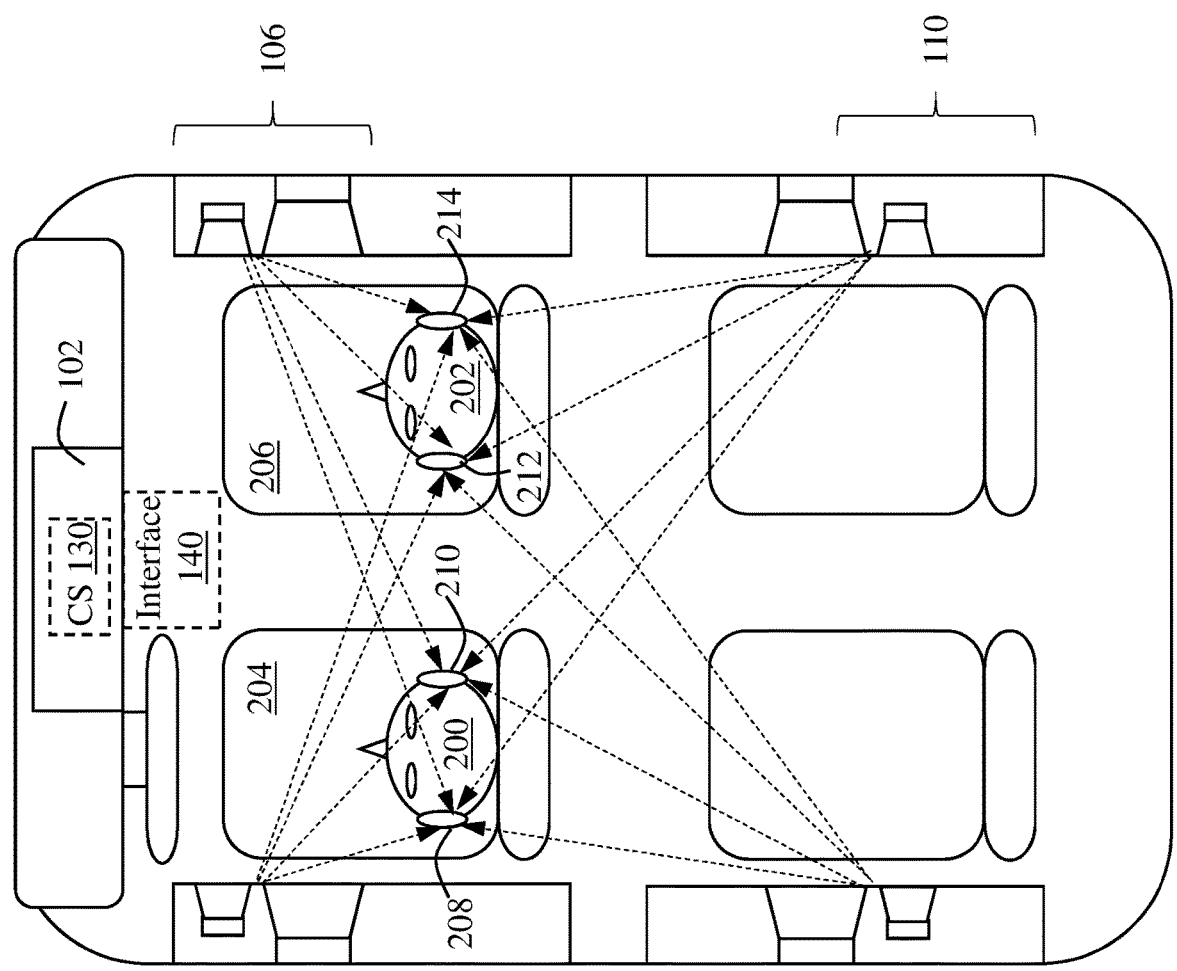
FIG. 2 shows the audio system of FIG. 1, further including a set of users and associated audio signals from the audio system, according to various implementations.

FIG. 2 shows two user's (or, listener's) heads 200, 202 as they are expected to be located relative to the speakers 104, 106, 108, 110 (shown in simplified view in FIG. 2, and in greater detail in FIG. 1). Heads 200, 202 of users are illustrated relative to the automobile seats 204, 206, which each include a base and a back. Driver 200 has a left ear 208 and right ear 210, and the ears of passenger 202 are labeled 212 and 214. Dashed arrows show various paths sound takes from the speakers 104, 106, 108, 110 to the user's ears 208, 210 and 212, 214 as described below. We refer to these arrows as "signals" or "paths," though in actual practice, we are not assuming that the speakers can control the direction of the sound they radiate, though that may be possible. Multiple signals assigned to each speaker 104, 106, 108, 110 are superimposed to create the ultimate output signal, and some of the energy from each speaker may travel omnidirectionally, depending on frequency and the speaker's acoustic design. The arrows merely show conceptually the different combinations of speaker and ear for easy reference. If arrays or other directional speaker technology are used, the signals may be provided to different combinations of speakers to provide some directional control. These arrays could be in the headrest or in other locations relatively close to the listener including locations in front of the listener.

Combinations of speakers can be used, with appropriate signal processing, to expand the spaciousness of the sound perceived by the user(s), and more precisely control the frontal sound stage. Different effects may be desired for different components of the audio signals—center signals, for example, may be tightly focused, while surround signals may be intentionally diffuse. In addition to differences due to the distance between each speaker and each ear, what each ear hears from each speaker will vary due to the angle at which the signals arrive and the anatomy of the listener's outer ear structures (which may not be the same for their left and right ears). Human perception of the direction and distance of sound sources is based on a combination of arrival time differences between the ears, signal level differences between the ears, and the particular effect that the user's anatomy has on sound waves entering the ears from different directions, all of which is also frequency-dependent. We refer to the combination of these factors at both ears, for a source at a given location, as the binaural response for that location. Binaural signal filters are used to shape sound that will be reproduced at a speaker at one location to sound like it originated at another location.

One aspect of the audio experience that is controlled by the tuning of the car is the sound stage. "Sound stage" refers to the listener's perception of where the sound is coming from. In particular, it is generally desired that a sound stage be wide (sound comes from both sides of the listener), deep (sound comes from both near and far), and precise (the listener can identify where a particular sound appears to be coming from). In an ideal system, someone listening to recorded music can close their eyes, imagine that they are at a live performance, and point out where each musician is located. A related concept is "envelopment," by which we refer to the perception that sound is coming from all directions, including from behind the listener, independently of whether the sound is precisely localizable. Perception of sound stage and envelopment (and sound location generally) is based on level and arrival-time (phase) differences between sounds arriving at both of a listener's ears, and the sound stage can be controlled by manipulating the audio signals produced by the speakers to control these inter-aural level and time differences. As described in U.S. Pat. No. 8,325,936, incorporated here by reference, various speakers in a car audio system may be used cooperatively to control spatial perception.

In some examples, the audio source provides only two channels, i.e., left and right stereo audio. Two other common options are four channels, i.e., left and right for both front and rear, and five channels for surround sound sources (usually with a sixth "point one" channel for low-frequency effects). Four channels are normally found when a standard automotive head unit is used, in which case the two front and two rear channels will usually have the same content, but may be at different levels due to "fader" settings in the head unit. To properly mix sounds for a system as described herein, the two or more channels of input audio are up-mixed into an intermediate number of components corresponding to different directions from which the sound may appear to come, and then re-mixed into output channels meant for each specific speaker in the system. One example of such up-mixing and re-mixing is described in U.S. Pat. No. 7,630,500, incorporated here by reference.

Component signals up-mixed from the source material can each be distributed to different phantom center image locations for rendering by the audio system 100. As described herein, the audio system 100 can permit user control of the phantom center image locations (e.g., the perceived location of the phantom center image of the audio output), which in various implementations, can be controlled via the interface 140 (FIG. 1). As explained with regard to FIGS. 3-6, the various fixed speakers 104, 106, 108, 110 can be used to make sound seem to be coming from phantom speakers at different locations. The actual number of phantom center image locations may depend on the processing power of the system used to generate them, or the acoustic needs of the system. Although phantom center image locations (or, phantom speakers) are shown in FIGS. 3-6 with respect to different listener locations as a number of phantom center image locations in front of each listener, the phantom center image locations may be distributed in height as well as left, right, front, and back. It is further understood that the arrays of phantom speakers in FIGS. 3-6 are illustrative of only some of the phantom speaker configurations possible for each listener. Each individual listener in the automobile can have control over his/her own phantom speaker location for audio playback, or a centralized control for all users can be provided.

A given up-mixed component signal may be distributed to any one or more of the phantom speakers, which not only allows repositioning of the component signal's perceived location, but also provides the ability to render a given component as either a tightly focused sound, from one of the phantom speakers, or as a diffuse sound, coming from several of the phantom speakers simultaneously. To achieve these effects, a portion of each component is mixed into each output channel (though that portion may be zero for some component-output channel combinations). For example, the audio signal for a right component will be mostly distributed to the right fixed front speaker 106, but to position each phantom speaker on the right side of the head 200, portions of the right component signal are also distributed to the right rear speaker 108 and the left rear speaker 110, due to both the target binaural response of the phantom speaker. The audio signal for the center component will be distributed to the corresponding right and left fixed speakers 104 and 106, with some portion also distributed to both the right and left rear speakers 108 and 110, controlling the location from which the listener perceives the phantom center image to originate. The particular distribution of component content to the output channels will vary based on how many and which speakers are installed.

Figure 3:
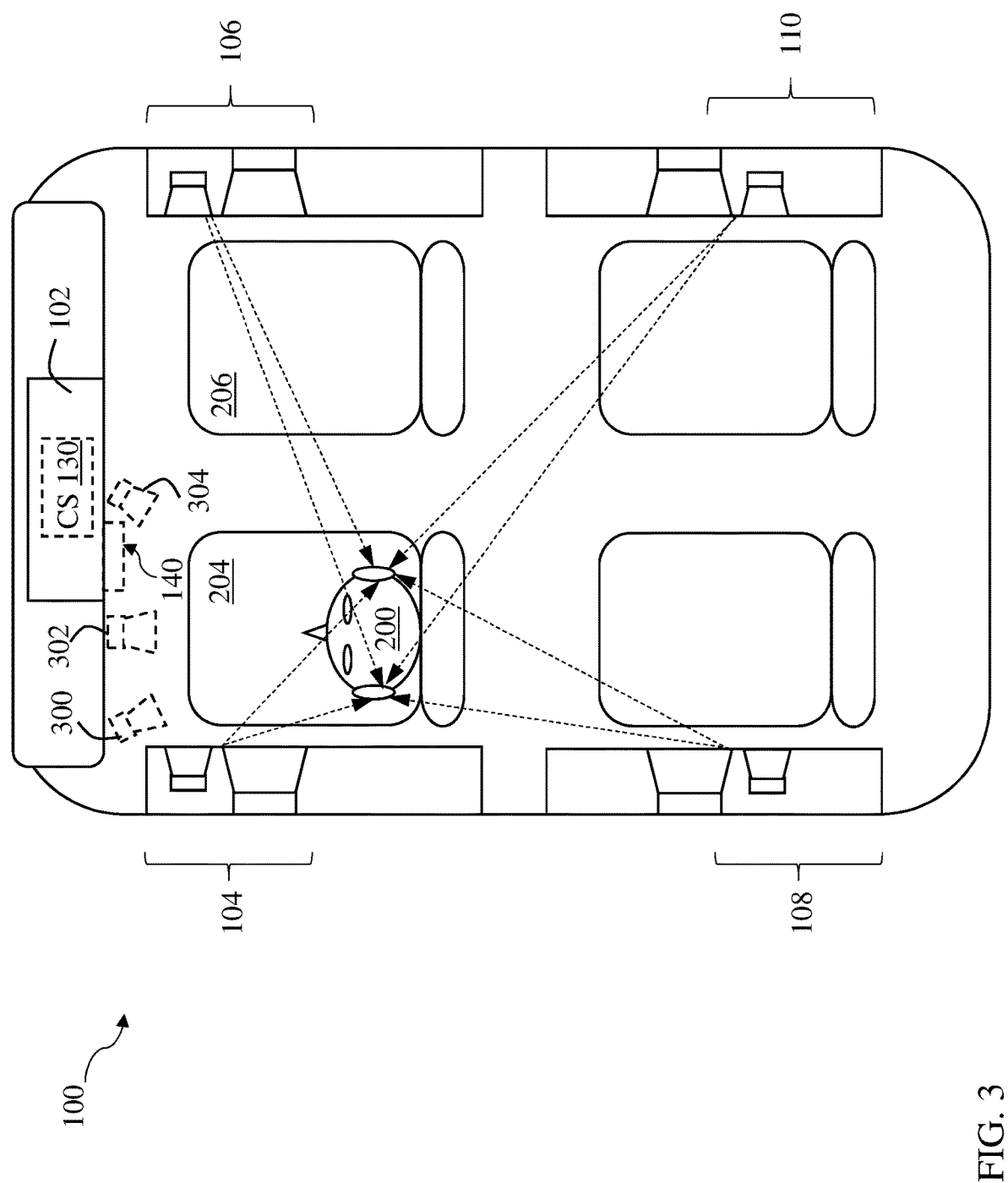
FIG. 3 illustrates phantom center image locations for a user in a driver seat location, as generated by the audio system of FIG. 1.
Figure 4:
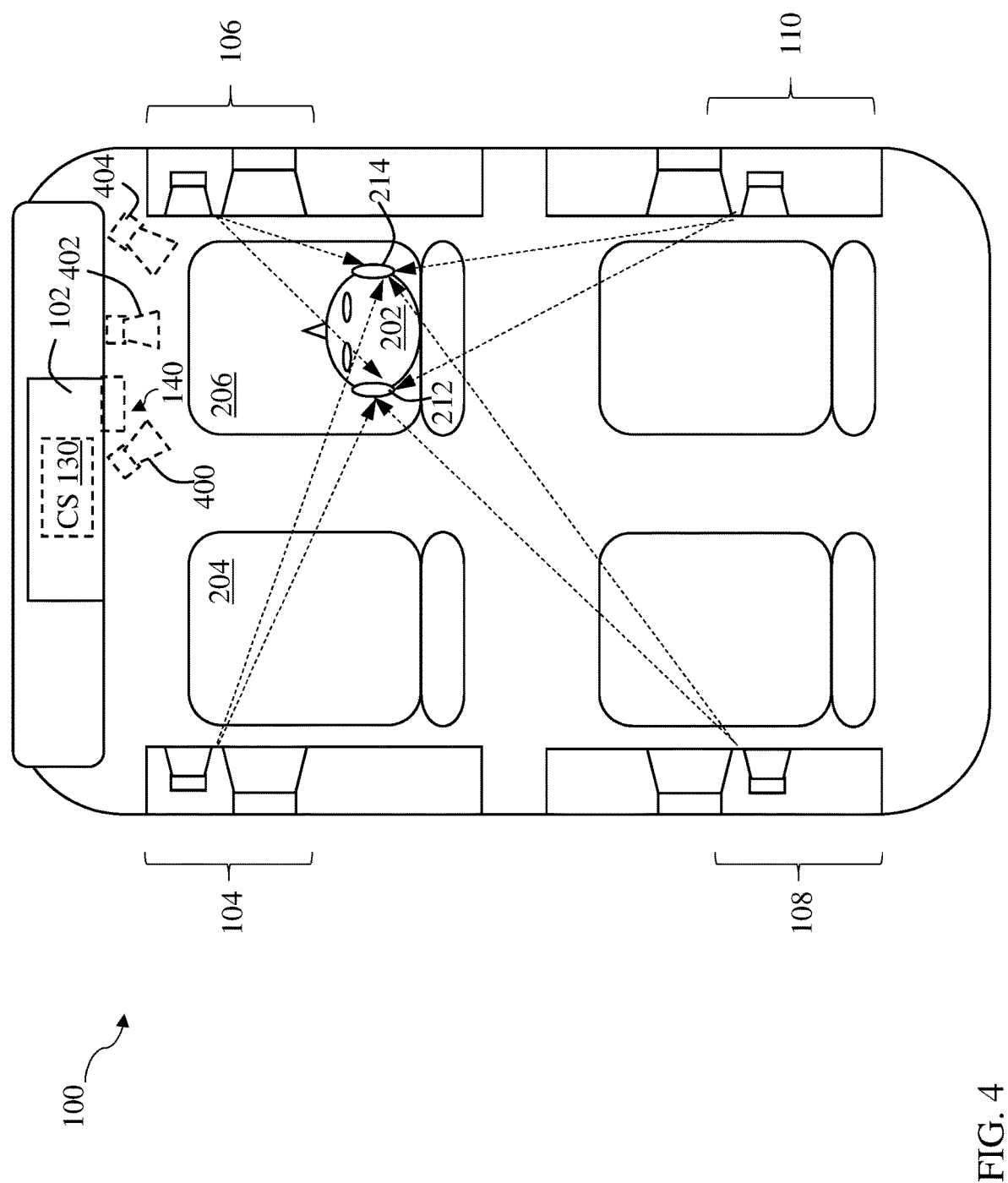
FIG. 4 illustrates phantom center image locations for a user in a front passenger seat location, as generated by the audio system of FIG. 1.
Figure 5:
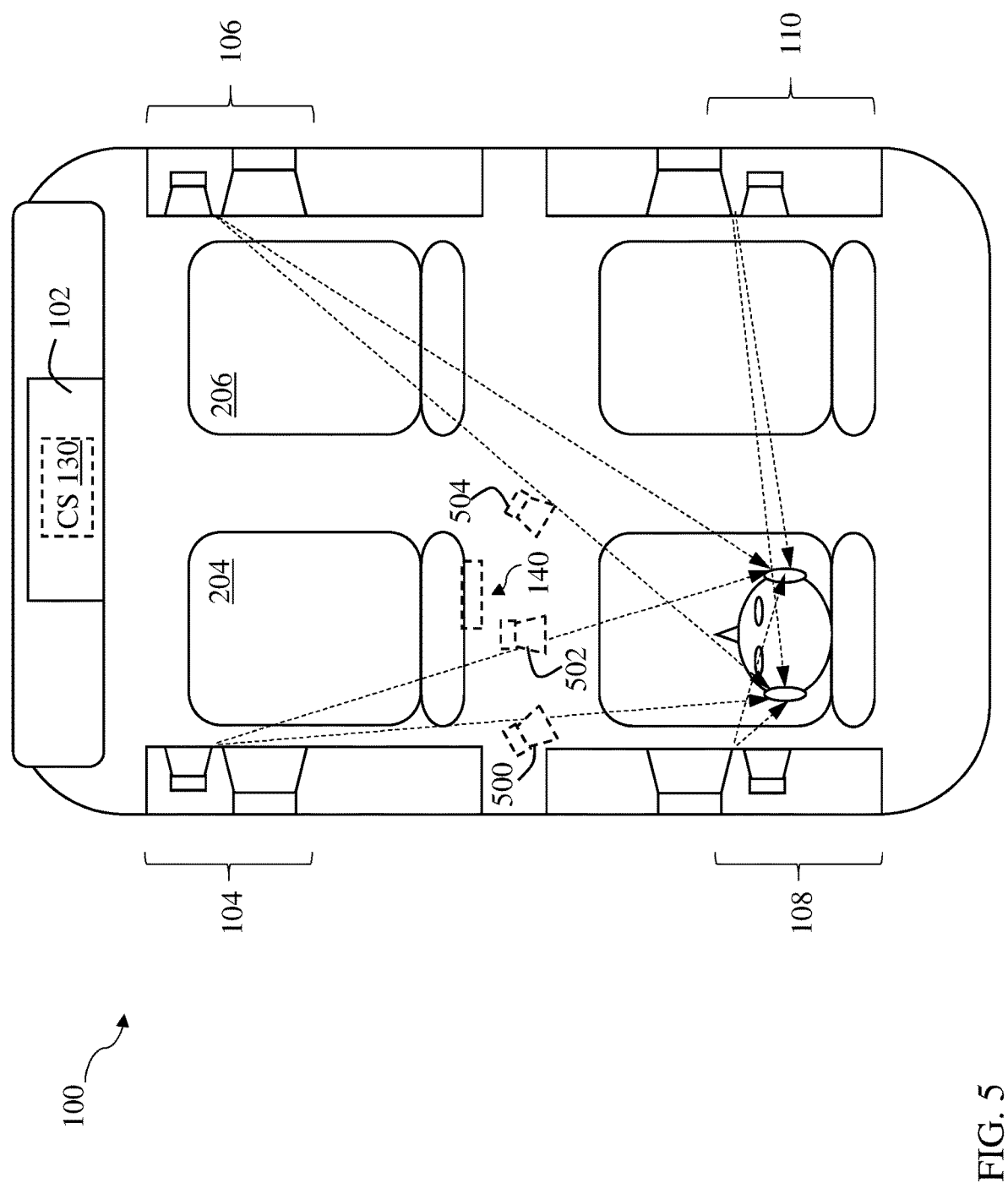
FIG. 5 illustrates phantom center image locations for a user in a rear left passenger seat location, as generated by the audio system of FIG. 1.
Figure 6:
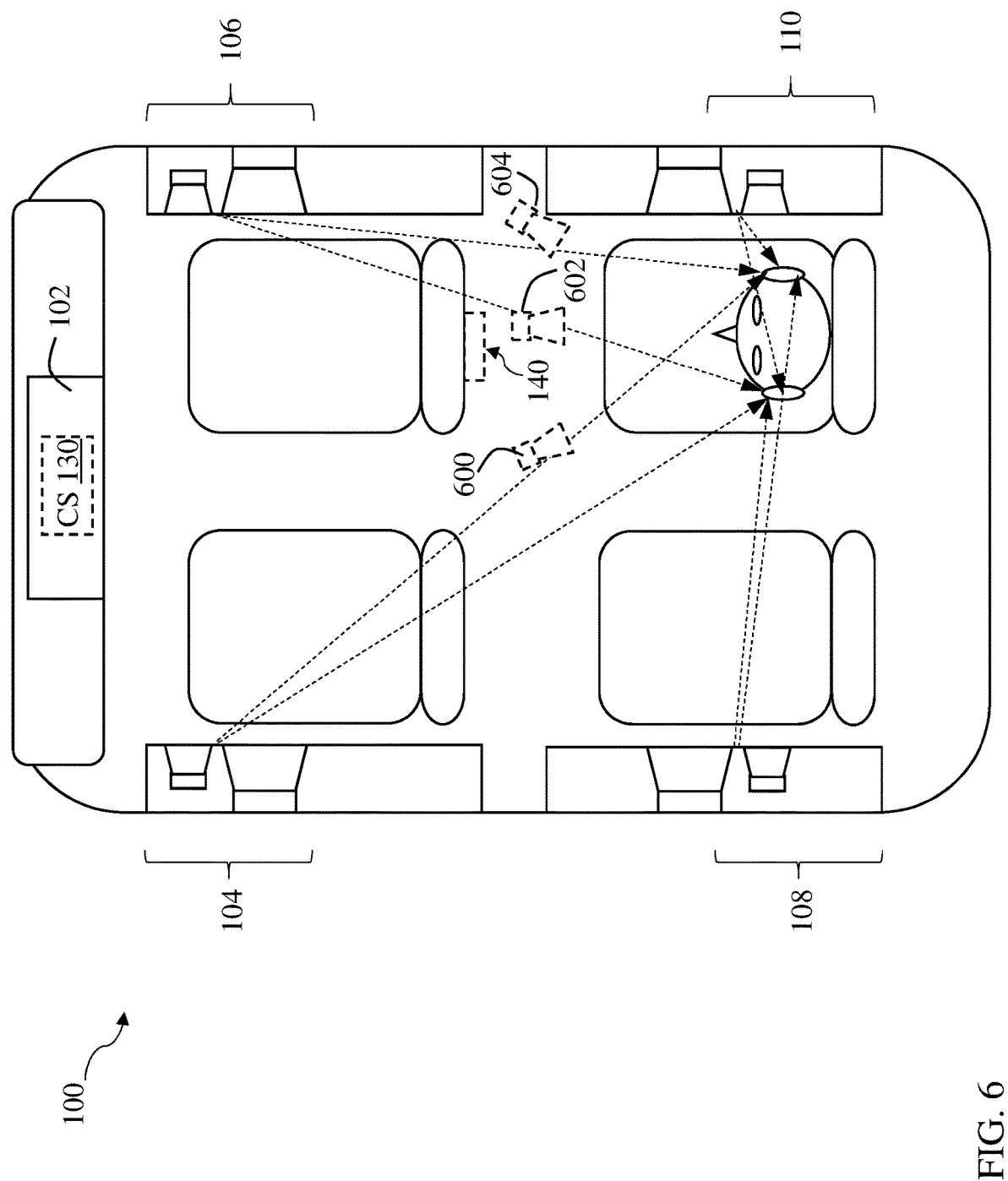
FIG. 6 illustrates phantom center image locations for a user in a rear right passenger seat location, as generated by the audio system of FIG. 1

FIG. 3 illustrates example perceived phantom center image locations 300, 302 and 304 for a user (listener) sitting in the driver's seat of the automobile. FIG. 4 shows example perceived phantom center image locations 400, 402 and 404 for a user (listener) sitting in the passenger's seat of the automobile. FIG. 5 shows example perceived phantom center image locations 500, 502, and 504 for a user (similar to a user in FIGS. 2-4) sitting in the rear left seat of the automobile. FIG. 6 shows example perceived phantom center image locations 600, 602, and 604 for a user (similar to a user in FIGS. 2-4) sitting in the rear right seat of the automobile. These phantom center image locations for each user seating location are merely example locations adjustable by the user, e.g., via interface 140 (FIGS. 1 and 2, illustrated in FIGS. 3-6 in simplified form for clarity of other illustrations). It is understood that in various implementations one or more interfaces similar to interface 140 can be located in the rear seat area of the vehicle, e.g., in a center console, on or proximate rear doors, or on the rear-facing surfaces of the front seats of the automobile. These additional interfaces 140 are illustrated in FIGS. 5 and 6 on the rear-facing surfaces of the front seats of the automobile merely for illustrative purposes.

The term, "component" can refer to each of the intermediate directional assignments to which the original source material is up-mixed. In various implementations described herein, a stereo signal is up-mixed into an arbitrary number of component signals. In one example, there may be a total of five: front and surround for each of left and right, plus a center component. In such an example, the main left and right components may be derived from signals which are found only in the corresponding original left or right stereo signals. The center components may be made up of signals that are correlated in both the left and right stereo signals, and in-phase with each other. The surround components may be correlated but out of phase between the left and right stereo signals. Any number of up-mixed components may be possible, depending on the processing power used and the content of the source material. Various algorithms can be used to up-mix two or more signals into any number of component signals. One example of such up-mixing is described in U.S. Pat. No. 7,630,500, incorporated here by reference. Another example is the Pro Logic Ilz algorithm, from Dolby®, which separates an input audio stream into as many as nine components, including height channels. In general, components can be treated as being associated with left, right, or center. Left components are preferably associated with the left side of the vehicle, but may be located front, back, high, or low. Similarly, right components are preferably associated with the right side of the vehicle, and may be located front, back, high, or low. Center components are preferably associated with the centerline of the vehicle, but may also be located front, back, high, or low. Additional descriptions of up-mixing components can be found in U.S. Patent Application No. 2017/0150288, incorporated here by reference.

In certain implementations, there may not be a (discrete) center component, but one can be created by upmixing a stereo signal. Filters may be used to convert weighted sums of up-mixed component signals into a signal corresponding to sound coming from the perceived phantom center image locations (e.g., locations 300, 302, 304 in FIG. 3 or locations 400, 402 404 in FIG. 4). While each of the filters can receive all of the component signals, in practice, each phantom center image location may reproduce sounds from only a subset of the component signals, such as those signals associated with the corresponding side of the vehicle. As with the component signals, a phantom center image signal may actually be a combination of left and right phantom images. Various topologies of signal re-mixing are possible, and may be selected based on the processing capabilities of the system used to implement the filters, or on the processes used to define the tuning of the vehicle, for example.

With continuing reference to FIGS. 1-6, in contrast to conventional automobile audio systems, the audio system 100 can provide user-selectable modifications to the spatial placement of the audio output. In some particular implementations, the audio system 100 permits selection of a perceived phantom center image location of audio output across a range of pre-defined locations (e.g., phantom speaker locations, as described herein). As noted herein, the phantom center image of the audio output is a designated position of sound produced by a set of speakers (e.g., one or more of speakers 104, 106, 108, 110) in the audio system 100 other than physical locations of those speakers in the automobile. In one example, the phantom center image of an audio output of a song (e.g., a studio recording or live concert) is designated as the perceived location of the lead vocalist in a band, or the soloist in an orchestra. While some users may prefer a spatial placement such that the lead singer appears to be located directly ahead (e.g., approximately straight in front of the user), others may prefer a spatial placement such that the band is accurately spaced across the soundstage (e.g., such as they may be spaced on a physical stage). These preferences can lead to distinct spatial placement of the perceived phantom center image, e.g., a vocalist appearing to sing from directly in front of the driver versus from a center of the dashboard, or a center of the vehicle (e.g., at a mid-car location). That is, the audio system 100 permits one or more users to vary the sound presentation across a range between a symmetric stage with a center image mid-car, and an asymmetric stage with a center image directly in front of the user(s).

Employing audio system 100, the user can actuate a control value command through the interface 140 (FIG. 1) for shifting the perceived location of the phantom center image of the audio output. In response to that control value command, the control system 130 can apply/modify a filter on at least one of the speakers 104, 106, 108, 110 (e.g., via source/processing/amplifying unit 102) to adjust the perceived location of the phantom center image, providing an updated phantom center image of the audio output as perceived by the listener.

In adjusting the perceived location of the phantom center image of the audio output, it is understood that the audio system 100 maintains an approximately static left channel output and an approximately static right channel output. This sound produced by speakers 104, 106, 108, 110 is detectable by the user, and includes an inter-aural phase and inter-aural level as perceived by the user that is consistent with a source from the designated position. This differentiates audio system 100 from conventional systems which perform balance control by moving the entire sound stage in response to a user command (e.g., by turning a balance dial). That is, audio system 100 is configured to adjust the perceived location of the phantom center image with no more than nominal movement of the left channel output and the right channel output. The scale of this nominal (or less than nominal movement) is determined by the number of speakers (and degrees of freedom) in the audio system 100. This is in contrast to a conventional balance adjustment, which changes the center placement of the audio output through a maximum perceptual change of the left or right channel output, whereby the change to the center output is affected only through gain changes in the left channel output or right channel output.

As described herein, the spatial placement of the perceived phantom center image can be adjusted in various ways according to implementations. In some cases, the control system 130 is configured to adjust the perceived location of the phantom center image by adjusting one or more of: a) a center image azimuth angle of the audio output, b) a center image distance of the audio output, or c) a center image elevation of the audio output. The phantom center image azimuth angle can be adjusted by modifying a filter weight on at least one of the speakers 104, 106, 108, 110 to adjust the angle at which the phantom center image appears relative to the user. The azimuth angle adjusts the angle at which the phantom center image is located relative to a user along a horizontal plane. The phantom center image distance can be adjusted, similarly by modifying a filter weight on at least one of the speakers 104, 106, 108, 110, to adjust the relative distance (closer or farther) at which the phantom center image appears with respect to the user. This distance adjustment moves the phantom center image closer to the user or farther from the user along a line at the same azimuth angle with respect to the user. The phantom center image elevation can be adjusted, similarly by modifying a filter weight on at least one of the speakers 104, 106, 108, 110, to adjust the relative elevation (higher or lower) at which the phantom center image appears with respect to the user. Elevation adjustment moves the phantom center image along a vertical axis that is perpendicular to the horizontal plane. In various particular implementations, the azimuth angle, distance and/or elevation can be modified using one or more speaker filter adjustments. In this sense, audio system 100 is configured to make three-dimensional adjustments to the perceived phantom center image location (along with other audio spatial placements described herein).

In some implementations, the phantom center image of the audio output is initially set to a default designated position. For example, the phantom center image of the audio output can be defined by default settings of the automobile, such as factory settings, and may place the phantom center image at the mid-car location (e.g., centered over the dashboard, such as where interface 140 is located in FIG. 1). However, in particular implementations, the default designated position can be defined by a user (e.g., via a user profile command) or according to a characteristic of the automobile. For example, a user can designate phantom center image location(s) and save that location data as a profile command in a profile or other in other automobile settings (e.g., via preset actuatable interface buttons). The profile can be connected with one or more additional user-defined settings (e.g., seat position, volume, temperature control), or may be accessible by an identification mechanism (e.g., via an identification file) such as a particular key fob identification, smart device identification, visual or auditory personal identification, etc. attributed to the user. Settings for multiple users can also be saved and/or retrieved by control system 130 to tailor the location(s) of the phantom center image in the automobile.

As described herein, in particular implementations, the perceived location of the phantom center image is adjustable across a range of pre-defined angles (e.g., azimuth angles), elevations and/or distances. In these cases, the audio system 100 matches the user interface command to a nearest one of the pre-defined angles, elevations and/or distances to provide the adjusted perceived location of the phantom center image. In particular implementations, the perceived location of the phantom center image is adjustable between two or more settings for each of the seating positions in the vehicle. In more specific cases, 2-5 settings are available for selection by the user. However, in still further implementations, five or more settings are available for selection by the user. The number of settings can be limited in some cases by the available storage of filters in the control system 130 (and associated storage device). In some cases, an even greater of settings can be available, e.g., using interpolation.

In some additional implementations, the location(s) of the phantom center image is user-adjustable and not necessarily predefined, such that the source/processing/amplifying unit 102 calculates and implements filter modifications in real-time or near real-time. In some cases, this real-time or near real-time calculation is performed by an algorithm stored in the source/processing/amplifying unit 102, and may interpolate between one or more fixed settings (e.g., as between locations $N_i$-$N_n$ in Table I, included herein), or calculate a location of the phantom center image independently of the fixed settings.

As noted herein, in other particular implementations, the audio system 100 permits individualized selection of the perceived location of the phantom center image of the audio output. In these implementations, the interface command includes a plurality of commands from distinct interface controls (e.g., a plurality of interfaces 140, as illustrated in FIGS. 2-6) to modify a plurality of phantom center images of the audio output, each relative to distinct seating locations. In these examples, each user is capable of individually adjusting the perceived phantom center image of audio output for their relative seating location (as described herein, based upon the expected binaural characteristics of the user's head at the seating location).

In additional implementations, a single (or global) interface can be used to permit all users to adjust one or more phantom center image locations. For example, interface 140 can be located in a center console of the vehicle and permit users at each of the seating locations to adjust their respective perceived phantom center image of audio output. This global interface can take the form of any other interface 140 shown or described herein. In still other implementations, the global interface can be accessible via one or more connected devices and/or smart devices. For example, a hard-wired or wireless controller can be coupled (e.g., physically or via a wireless communications protocol such as a Bluetooth protocol) to the control system 130 and allow user(s) to perform interface controls as described herein. Additionally, the control system 130 can be programmed to receive interface commands from a software application such as a mobile phone application or other smart device application. In these cases, one or more users can access a global control interface for perceived phantom center image locations relative to one or more seat locations using the software application on a connected device and/or smart device.

In some additional implementations, audio system 100 permits user(s) to adjust additional characteristics of the audio output, in addition to perceived phantom center image location. For example, in some implementations, control system 130 is configured to receive at least one additional interface command (e.g., via interface 140) to modify at least one of: a) a left channel output, b) a right channel output, or c) content produced through up-mixing of an audio system signal or additional audio channels across the audio system 100. Based upon this user interface command, the control system 130 is configured to adjust an additional spatial placement of the audio output.

Figure 7:
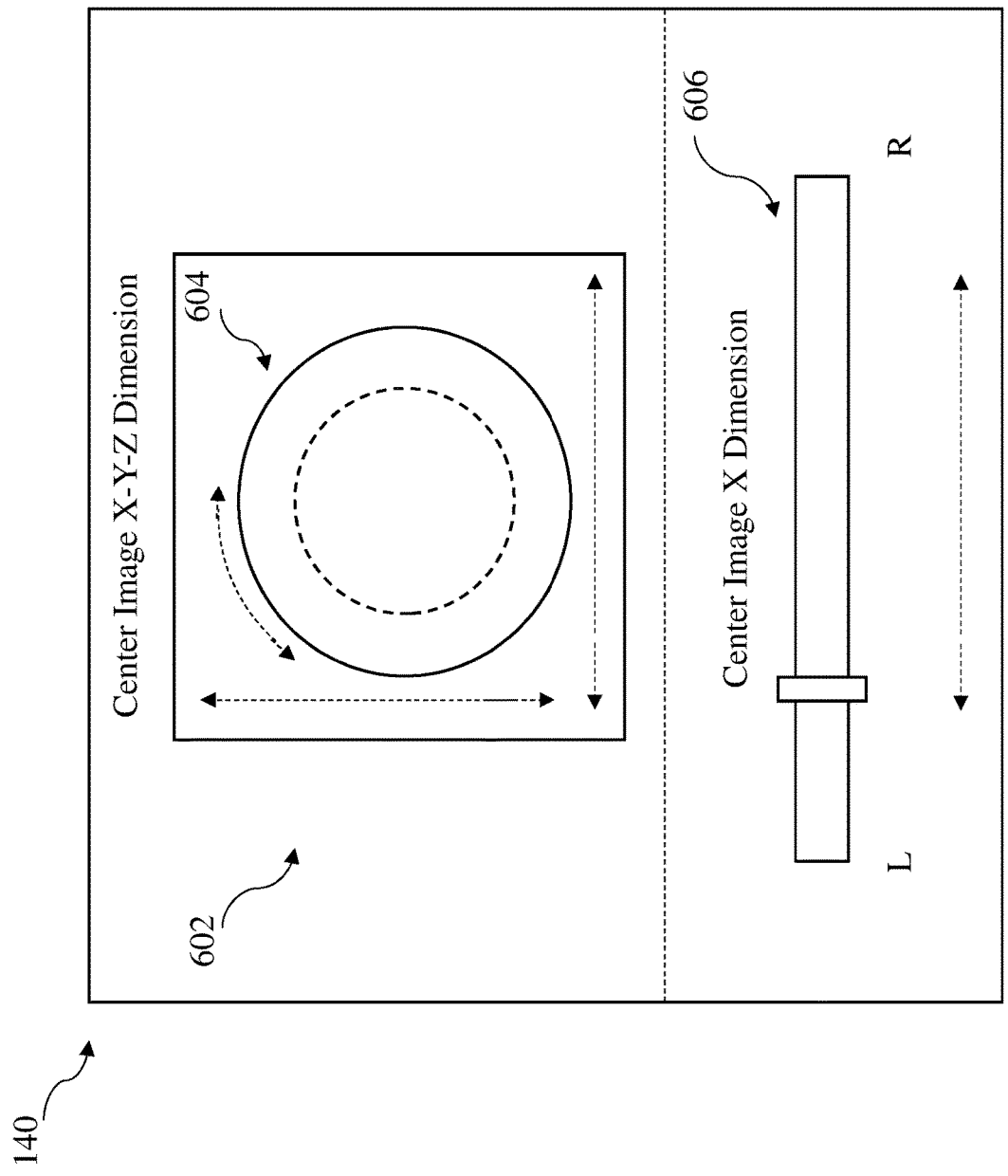
FIG. 7 shows an example user interface for controlling audio output in the audio system of FIG. 1, according to various implementations.

FIG. 7 shows an example of an interface 140 for controlling the phantom center image placement of audio output from the audio system 100 according to various implementations. As shown, the interface 140 can include one or more interface command controls 602 for controlling aspects of the audio output as described herein. In some cases, interface command controls 602 can include a touch-screen, one or more actuatable buttons or knobs, a motion sensor, voice sensor (microphone) or any other interface control capable of receiving commands from a user. While in some cases the interface 140 is located in the automobile, such as an integrated interface within other audio control functions presented to the users, in other cases, the interface 140 can be accessible via a connected device such as a smart device, or via one or more voice, gesture and/or tactile commands. In the example shown in FIG. 6, the command controls can include an actuatable knob (knob) 604 along with an actuatable slider (slider) 606. It is understood that any interface command control 602, such as the knob 604 and the slider 606 can be physical components (e.g., three-dimensional objects) or touch-screen displays representing such components. The interface command controls 602, regardless of their display mechanism, can be actuatable to send control value commands to the control system 130 (FIG. 130) to modify at least one filter (in the set of filters) on the audio output in order to adjust a perceived location of the phantom center image of the audio output. In some cases, a command control 602 such as knob 604 can enable three-dimensional adjustment of the phantom center image location (e.g., via multi-dimensional toggle, rotation and/or compression), however, in other cases, command controls 602 can combine to enable three-dimensional adjustment (e.g., where slider 606 controls azimuth and knob 604 controls distance and elevation).

Figure 8:
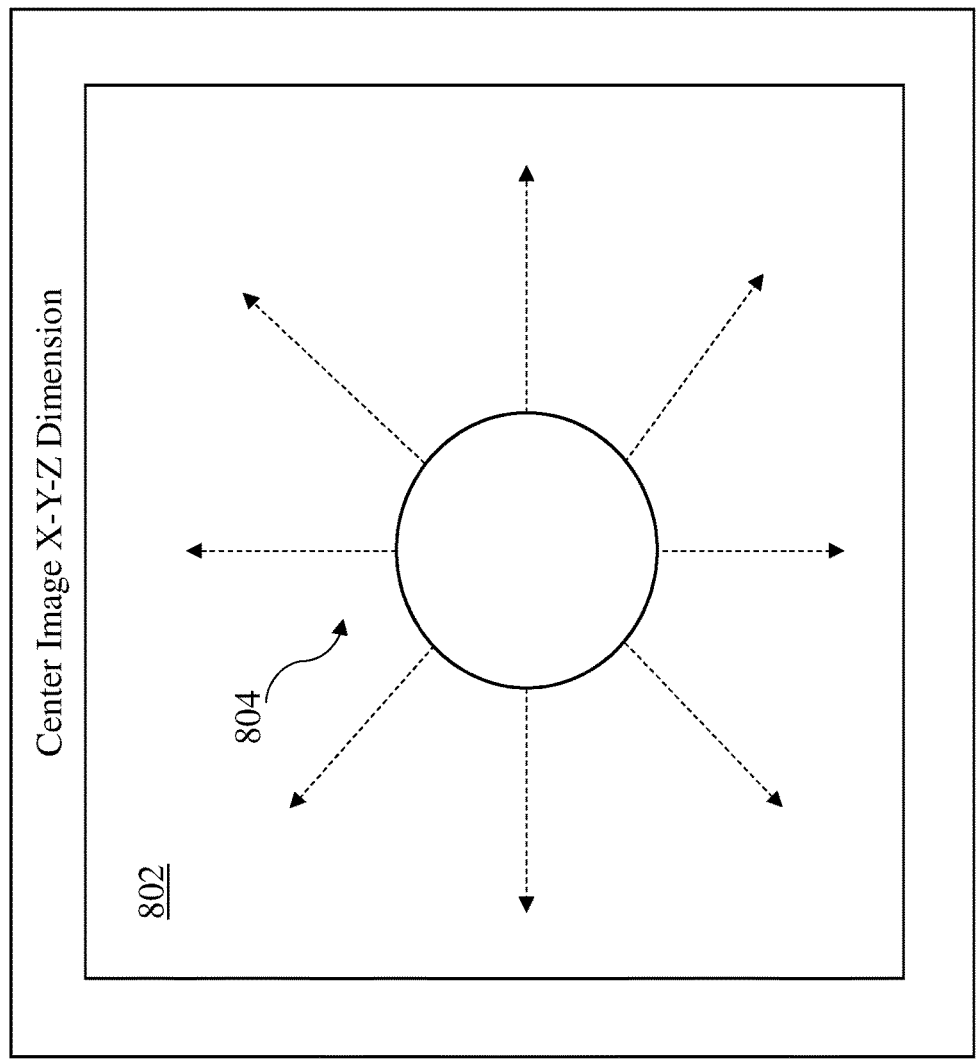
FIG. 8 shows an additional example user interface for controlling audio output in the audio system of FIG. 1, according to various implementations.

In an additional example implementation shown in FIG. 8, the interface 140 can include a touch screen 802 with an icon 804 that can be dragged in both the X and Y dimension (as well as diagonally between these axes) to adjust the azimuth or the elevation of the perceived location of the phantom center image for a user at a seating location. In some cases, the icon 804 can be double-tapped, held, twisted (left or right) or otherwise manipulated to adjust the distance of the perceived location of the phantom center image from the user at the seating location.

The control system 130 can include a programmable processor, and can be programmed to apply/modify at least one filter on the audio output in response to receiving the control value command. In some cases, the control system 130 is programmed to adjust the perceived location of the phantom center image across a range of pre-defined locations (e.g., locations 300, 302, 304 in FIG. 3 or locations 400, 402, 404 in FIG. 4). In these implementations, the pre-defined locations and their associated speaker filters are stored in control system 130 or otherwise accessible by control system 130 (e.g., via a network interface or cloud-based communication system). These location/filter correlations can allow the control system 130 to provide real-time adjustment of the perceived location of the phantom center image in response to the control value command at interface 140. Table I shows a simplified example correlation table for particular phantom center image locations with respect to one seating location (e.g., the location of any one of the users in FIGS. 2-6). As illustrated in Table I, the filter weights applied to the left channel and right channel remain the same across all locations of the perceived phantom center image (e.g., locations 300, 302, 304 in FIG. 3 or locations 400, 402 404 in FIG. 4). That is, the weights applied to the left channel output (left upmixing filter) and right channel output (right upmixing filter) remain the same regardless of the location of the perceived phantom center image. However, the weight applied to the center upmixing filter is varied across these locations (e.g., locations 300, 302, 304 in FIG. 3 or locations 400, 402 404 in FIG. 4). In this sense, the control system 130 is configured to apply a distinct weight to the center upmixing filter at each of the distinct phantom center image locations for each user (at a unique seating location).

TABLE I

| | Left Upmixing Filter | Center Upmixing Filter | Right Upmixing Filter |
|---|---|---|---|
| Location $N_i$ | $W_x$ | $W_y$ | $W_z$ |
| . | $W_x$ | $W_{y+N1}$ | $W_z$ |
| . | $W_x$ | $W_{y+N2}$ | $W_z$ |
| . | $W_x$ | $W_{y+N3}$ | $W_z$ |
| Loc. $N_n$ | $W_x$ | $W_{y+Nn}$ | $W_z$ |

In some additional implementations, the weights applied to the left channel output (left upmixing filter) and right channel output (right upmixing filter) can be modified slightly across the center image locations, e.g., due to interaction between components, while the weight applied to the center upmixing filter is varied significantly. While the constant-weight configurations for the left upmixing filter and right upmixing filters are shown the Table I, it is understood that these weights may be modified slightly across the center image locations.

In various implementations, the weighting on the central upmixing filters can be used to control modification of one or more of azimuth angle, elevation and/or distance of the phantom center image relative to the user, while maintaining a substantially fixed right channel output and fixed left channel output.

In some implementations, Table I can be updated according to user feedback, e.g., as requested by control system 130, in order to improve the response of the audio system 100 to user commands. As noted herein, in some implementations, the user can actuate command control(s) 602 or touch screen 802 which have pre-defined values correlated with locations along the array of phantom center image locations. In the example of a knob or a slide, the user can actuate the command control 602 (FIG. 7) or touch screen 802 (FIG. 8) to a specific value (e.g., in increments of X) that is directly correlated with a location (e.g., location 304, FIG. 3) and associated filter configuration (e.g., as in Table I). However, in other cases, the command control 602 (FIG. 7) or touch screen 802 (FIG. 8) permits the user to select values that are "between" adjacent locations (e.g., locations 302 and 304, FIG. 3), such that a pre-defined filter configuration is not necessarily saved for that location. In these scenarios, the control system 130 is configured to detect the control command value and choose a closest location to that value in order to select a corresponding weight ($W_y$) to apply to the filter configuration.

In still other implementations, as noted herein, the location(s) of the perceived phantom center image is not necessarily predefined, such that the control system 130 calculates and implements filter modifications in real-time or near real-time. In some cases, the control system 130 can include a machine learning engine, which may include an artificial neural network (ANN) or other artificial intelligence component configured to enhance the ability of audio system 100 to adjust the perceived location of the phantom center image in response to user commands. Additionally, the machine learning engine 130 can be used to update the stored location/filter correlations, e.g., in Table I in order to enhance the ability of audio system 100 to adjust the perceived location of the phantom center image in response to user commands.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A computer-implemented method of controlling an audio system with at least two inputs in an automobile, the method comprising:
receiving at least one user interface command to modify a phantom center image of audio output from the audio system in the automobile,
wherein the user interface command comprises a user profile command or a preset command attributed to a user of the automobile, wherein the user profile command or the preset command is obtained from an identification file attributed to the user,
wherein the phantom center image of the audio output comprises a designated position of sound produced by a set of speakers in the audio system other than physical locations of the set of speakers in the audio system; and
adjusting a perceived location of the phantom center image of the audio output from the audio system based upon the at least one user interface command to modify the phantom center image of the audio output.

2. The computer-implemented method of claim 1, wherein the phantom center image is initially set to a default designated position.

3. The computer-implemented method of claim 2, wherein the default designated position is defined by a user or according to a characteristic of the automobile.

4. The computer-implemented method of claim 1, wherein the at least one user interface command comprises a control value command for shifting the phantom center image of the audio output.

5. The computer-implemented method of claim 1, wherein the perceived location of the phantom center image of the audio output is adjusted by modifying a filter weight on at least one speaker in the audio system.

6. The computer-implemented method of claim 1, wherein the perceived location of the phantom center image is adjustable across a range of pre-defined angles, wherein the adjusting comprises matching the at least one user interface command to a nearest one of the pre-defined angles to provide the adjusted perceived location of the phantom center image of the audio output.

7. The computer-implemented method of claim 1, wherein the at least one user interface command comprises a plurality of commands from distinct user interface controls to modify a plurality of phantom center images of audio output, each relative to distinct seating locations, from the audio system in the automobile.

8. The computer-implemented method of claim 1, wherein adjusting the perceived location of the phantom center image of the audio output comprises adjusting at least one of a center image azimuth angle of the audio output, a center image distance of the audio output or a center image elevation of the audio output.

9. The computer-implemented method of claim 1, further comprising:
receiving at least one additional user interface command to modify at least one of a left channel output, a right channel output or content produced through an up-mixing of an audio system signal or additional audio channels across the audio system; and
adjusting an additional spatial placement of the audio output from the audio system based upon the at least one additional user interface command.

10. An automobile audio system comprising:
a set of speakers for generating an audio output in an automobile; and a control system comprising a user interface, the control system coupled with the set of speakers and configured to:
  receive at least one user interface command, via the user interface, to modify a phantom center image of the audio output from the set of speakers,
    wherein the phantom center image of the audio output comprises a designated position of sound produced by the set of speakers other than physical locations of the set of speakers;
  adjust a perceived location of the phantom center image of the audio output from the set of speakers based upon the at least one user interface command to modify the phantom center image of the audio output,
    wherein the set of speakers provides the audio output across a soundstage with an approximately static left channel output and an approximately static right channel output while adjusting the perceived location of the phantom center image of the audio output;
  apply a first set of filters that causes sound produced by the set of speakers to have characteristics at an intended position of a user's head of sound produced by a sound source located at a first designated position other than the physical locations of the set of speakers; and
  in response to the at least one user interface command, apply a second set of filters that causes sound produced by the set of speakers to have characteristics at the intended position of the user's head of sound produced by a sound source located at a second designated position other than the physical locations of the set of speakers and different from the first designated position.

11. The automobile audio system of claim 10, wherein the phantom center image is initially set to a default designated position, wherein the default designated position is defined by a user or according to a characteristic of the automobile.

12. The automobile audio system of claim 10, wherein control system is configured to adjust the perceived location of the phantom center image of the audio output by modifying a filter weight on at least one speaker in the set of speakers.

13. The automobile audio system of claim 10, wherein the perceived location of the phantom center image is adjustable across a range of pre-defined angles, wherein the adjusting comprises matching the at least one user interface command to a nearest one of the pre-defined angles to provide the adjusted perceived location of the phantom center image of the audio output.

14. The automobile audio system of claim 10, wherein the at least one user interface command comprises a plurality of commands from distinct user interface controls to modify a plurality of phantom center images of audio output, each relative to distinct seating locations, from the set of speakers.

15. The automobile audio system of claim 10, wherein the control system is further configured to:
  receive at least one additional user interface command to modify at least one of a left channel output, a right channel output or a phase difference across the set of speakers; and
  adjust an additional spatial placement of the audio output from the set of speakers based upon the at least one additional user interface command.

16. The automobile audio system of claim 10, wherein the designated position of sound produced by the set of speakers is detectable by the user and comprises an inter-aural phase and inter-aural level as perceived by the user that is consistent with a source from the designated position.

17. A computer-implemented method of controlling an audio system with at least two inputs in an automobile, the method comprising:
  receiving at least one user interface command to modify a phantom center image of audio output from the audio system in the automobile,
    wherein the phantom center image of the audio output comprises a designated position of sound produced by a set of speakers in the audio system other than physical locations of the set of speakers in the audio system;
  adjusting a perceived location of the phantom center image of the audio output from the audio system based upon the at least one user interface command to modify the phantom center image of the audio output
    wherein the audio system provides the audio output across a soundstage with an approximately static left channel output and an approximately static right channel output while adjusting the perceived location of the phantom center image of the audio output;
  applying a first set of filters that causes sound produced by the set of speakers to have characteristics at an intended position of a user's head of sound produced by a sound source located at a first designated position other than the physical locations of the set of speakers; and
  in response to the at least one user interface command, apply a second set of filters that causes sound produced by the set of speakers to have characteristics at the intended position of the user's head of sound produced by a sound source located at a second designated position other than the physical locations of the set of speakers and different from the first designated position.

18. The computer-implemented method of claim 17, wherein the phantom center image is initially set to a default designated position, wherein the default designated position is defined by a user or according to a characteristic of the automobile.

19. The computer-implemented method of claim 17, wherein the at least one user interface command comprises a control value command for shifting the phantom center image of the audio output.

20. The computer-implemented method of claim 17, wherein the designated position of sound produced by the set of speakers is detectable by the user and comprises an inter-aural phase and inter-aural level as perceived by the user that is consistent with a source from the designated position.

* * * * *